May 6, 1924.
C. SIRCH
SCALE
Filed June 3, 1921
1,492,654
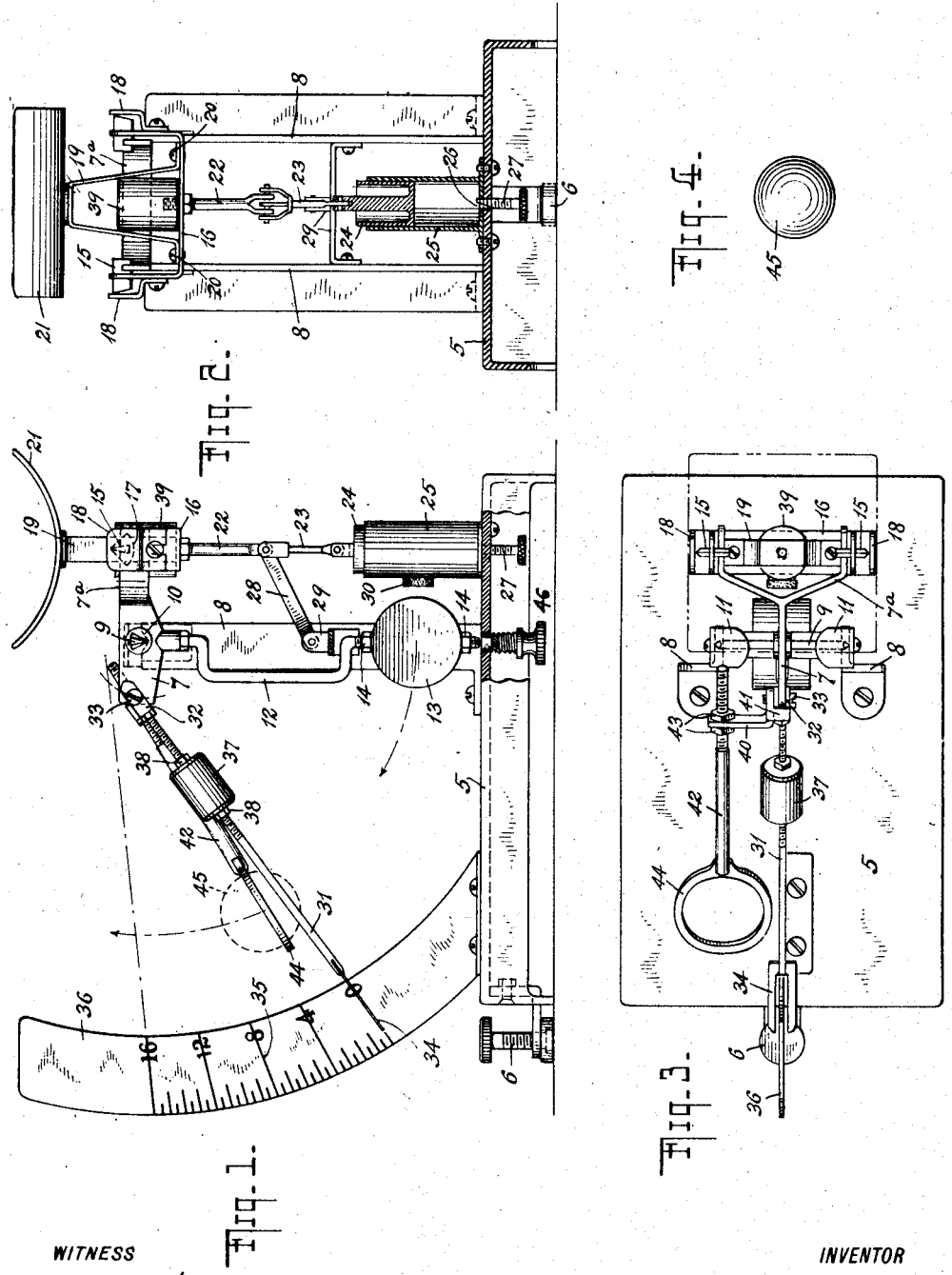
WITNESS
G. V. Rasmussen
INVENTOR
CHARLES SIRCH
BY
ATTORNEYS Patented May 6, 1924.

1,492,654

UNITED STATES PATENT OFFICE.

CHARLES SIRCH, OF NEW YORK, N. Y.

SCALE.

Application filed June 3, 1921. Serial No. 474,652.

*To all whom it may concern:*

Be it known that I, CHARLES SIRCH, a citizen of the United States, and resident of the borough of Manhattan, city, county, and State of New York, have invented certain new and useful Improvements in Scales, of which the following is a specification.

My invention relates to scales for weighing articles and has for its object to provide a scale of novel and simple construction without springs and which is small and compact and absolutely dependable and reliable regardless of changes in the weather and atmospheric conditions. A further object is to provide a scale in which the indicating mechanism does not vibrate to a position of rest under the action of the article being weighed but comes to rest promptly at the proper point upon the chart which corresponds to the weight of said article. Other more specific objects of the invention will appear from the description hereinafter and the features of novelty will be pointed out in the appended claims.

In the accompanying drawings, which illustrate an example of the invention without defining its limits, Figure 1 is a side elevation of the novel scale; Fig. 2 is an end elevation thereof, partly in section; Fig. 3 is a plan view, and Fig. 4 is a detail view of a weight which may be used in combination with the scale to increase its operative range.

As shown in the drawings, the scale comprises a suitable base 5 which may be constructed of sheet metal and which may be provided with a levelling device in the form of a screw 6 adjustably connected with said base 5, for instance at one end, whereby the scale may be accurately levelled. The scale further comprises a main lever or beam 7 mounted to rock upon standards 8 projecting upwardly from and secured to the base 5; in order that the main lever 7 may be very sensitive, it is preferred to provide the same with pivots in the form of knife edges 9 which set in the angles of angular recesses 10 located at the upper ends of the standards 8, as shown in Fig. 1. Stops or guards 11 may be attached to or form parts of the standards 8 so as to project over the ends of the knife edges 9 to prevent shifting thereof in directions transverse to the recesses 10. A support preferably in the form of a rod 12 depends from the main lever 7 in registry with the pivots 9 and at its lower end carries a main weight 13 which is adjustably mounted upon the rod 12, and is fixed in an adjusted position by means of nuts 14; the rod 12 may be shaped in any suitable manner to provide the required freedom of motion without interference with other parts of the scale.

At its one end the main lever or beam 7 branches outwardly in the form of arms 7ª which carry pivots, preferably also in the form of knife edges 15 upon which a depending yoke 16 is supported by means of openings 17 of approximately triangular form, in the apices of which the knife edges 15 are seated. To prevent shifting of the yoke 16 in directions lengthwise of the pivots 15 suitable stops 18 may be provided upon said yoke and positioned thereon so as to extend over the ends of said pivots 15, as shown in Figs. 2 and 3. The yoke 16 carries an upwardly extending support 19 which may comprise an end member and continuing spaced side members secured to the yoke 16 by means of screws 20 or in any other suitable manner; a tray, platform or other convenient carrier 21 is fixed upon the support 19, as shown in Figs. 1 and 2, for the reception of the article to be weighed. A stem 22 depends from the yoke 16 and is rigidly attached thereto at one end and at its other end is pivotally connected with a link 23 which, in turn, is pivotally connected with a piston 24 reciprocable in the cylinder 25 mounted upon the base 5 and comprising therewith a dash-pot as shown in Fig. 2; the dash-pot is provided with an air vent 26 controlled by a valve in the form of an adjustable screw 27 having its inner end bevelled to selectively adjust the operative dimension of the air vent 26. In order to make the weight of the package or other article even and uniform, regardless of the position or location in which said package or other article is set upon the tray 21 and to prevent a disturbance thereby of the operation of the scale because of a resultant change in the position of the tray and its connected parts from the normal, a link 28 is provided which is pivotally connected at one end with the depending stem 22 and at its other end with a projection 29 fixed upon the standards 8, as shown in Fig. 1. In the preferred construction a suitable cushion 30 is located upon the dash-pot 25 in the path of the main weight 13 for the purpose to be more fully set forth hereinafter.

At its other end the main lever 7 carries a combination indicator and counterbalance which comprises a rod 31 having its inner end detachably connected, as by screw-threading with a fork 32 which in turn is detachably fastened to the main lever 7 by means of a screw or the like 33; at its outer end the rod 31 terminates in the form of a pointer 34 which is movable in the arc of a circle in operative relation to the chart 35 produced upon the scale plate 36 which extends upwardly from and is fixed upon the base 5. In the preferred arrangement the pointer 34 is constructed in the form of a fork, the two members of which extend across the opposite faces of the scale plate 36; the latter, in this case, is provided with duplicate charts 35 upon its opposite faces so that the scale is readable from opposite directions. A counterbalance weight 37 is adjustably mounted upon the rod 31 and is fixed in an adjusted position by means of nuts 38, the rod 31 being screw-threaded throughout a portion of its length for the accommodation of these nuts 38. A second counterbalance weight 39 is mounted upon the main lever 7 upon the opposite side of the pivots 9 from that of the weight 37, said second weight 39 being, for instance, fixed upon the yoke 16, as shown in Fig. 2. With this arrangement it is possible to readily adjust the scale at all times to bring the pointer 34 into exact registry with the zero indication on the chart or charts 35 by simply shifting the counterbalance weight 37 lengthwise of the rod 31 in one direction or the other to bring about a proper co-operation between the counterweights 37 and 39 and the main weight 13.

In practice, if an article such as a package is placed upon the tray 21 the latter will be depressed thereby and thus rock the lever 7 upon the pivots 9 whereby the pointer 34 is moved along the chart 35 to the point thereon which corresponds to and indicates the weight of the article in question. As the lever 7 is rocked in the described manner the stem 22 and link 23 will be moved downwardly and will actuate the dash-pot by moving the piston 24 into the cylinder 25, thus bringing the pointer 34 to rest as soon as the proper point on the chart 35 is reached, vibration of said pointer across said point on the chart to a position of rest being prevented by the action of the dash-pot and making possible an immediate reading of the indicated weight of said article. As the piston 24 moves into the cylinder 25 the air contained therein will be forced out through the air vent 26 which may be adjusted as to operative dimensions by the screw 27 to vary the speed of escape of said air to obtain the desired operation of said pointer; as the piston 24 moves outwardly relatively to said cylinder 25 air is drawn into the same through said air vent 26. During the downward movement of the parts as described the tray 21 maintains a substantially horizontal position because of its pivotal mounting upon the main lever 7, so that no special care need be exercised in positioning the article to be weighed thereon. In case such article is placed to one side or the other of the centre of said tray 21, the link 28 will prevent this fact from disturbing the operation of the parts and will maintain the stem 22, link 23 and piston 24 in substantial axial alignment throughout the operative movement induced by the article being weighed; the slight deviation of the stem 22 and link 23 from a perfectly straight path brought about by the movement of the outer end of the link 28 in the arc of a circle having the projection 29 as a centre will have no appreciable effect upon the efficiency of the operation.

As shown in Fig. 1 the chart 35 is divided into designations indicating ounces and reads from zero to sixteen, thus indicating that the scale in its normal condition has an operative range from zero to one pound. In order to increase the operative range of said scale without increasing the dimensions of the scale plate 36 and chart 35 thereon and the other elements of the scale, a bracket 40 may be connected with the main lever 7, for instance by the screw 33, and provided with an off-set 41 extending over the fork 32 to prevent pivotal movement of said bracket 40 upon the screw 33. An arm 42 is adjustably connected with said bracket 40, for instance by screw-threading, and is fixed in an adjusted position by means of nuts 43; at its outer free end the arm 42 is provided with means for holding a weight of predetermined size, said means in the preferred form comprising a ring 44 and the weight 45 being constructed in the form of a sphere to fit said ring 44. When viewed in plan, as in Fig. 2, the arm 42 extends substantially parallel to the rod 31, but extends somewhat above the same at an inclination toward its free end when viewed from the side, as in Fig. 1. When the weight 45 is located in the ring 44, as shown by dotted lines in Fig. 1, the parts will be actuated to swing the weight 13 against the cushion 30 and to move the pointer 34 downwardly beyond the zero point on the chart 35; it will be understood that the weight 45 is of such a character and so positioned by the ring 44 that a predetermined weight on the tray 21 will be required to bring the pointer 34 into registry with the zero mark on the chart 35. For instance, if it is intended to increase the range of the scale from one pound to two pounds, the weight 45 will be such that an article weighing a pound will be required on the tray 21 to bring the pointer 34 into registry with the zero mark on the chart 35; if, now, an article weighing twenty-four ounces or, in other words, a pound and a half, is placed upon the tray 21, the pointer 34 will be moved to the designation eight on the chart 35. The effect produced by the addition of the weight 45 or, in other words, its character being known, this will immediately indicate that the article weighs eight ounces plus the weight required to bring the weight 45 to the zero point or in other words, one pound and a half. By utilizing differently dimensioned weights 45 and by adjusting the ring 44 or its equivalent toward and away from the pivots 9 by shifting the arm 42 in the bracket 40, the range of the scale may be still further increased or varied in any desired manner; very fine adjustments of the weight 45 to bring the pointer 34 into proper registry with the zero mark in the desired manner may be effected by bending or otherwise changing the inclination of the arm 42 with respect to the rod 31 when viewed from the side, as in Fig. 1. The scale is thus of great flexibility and may efficiently be utilized in many fields and is particularly serviceable in connection with the weighing of packages, letters and other mail matter.

To fix the parts in position against vibration and oscillation when the scale is in storage or transit, a socketed screw 46 may be provided in the base 5 in registry with the free end of the rod 12 when in its position of rest. By adjusting the screw 46 in a manner to bring its socketed end over the end of said rod 12 the latter, and with it the other parts of the scale, are held against movement.

The scale is in no way dependent upon springs for its operation and therefore is reliable regardless of changes in the weather or variations in temperature, and is of maximum rapidity in action and at the same time is capable of being instantly read because of the fact that the pointer does not oscillate to and fro to a position of rest on the chart but immediately comes to rest in the position to which it is carried by the action of the article being weighed. This result is secured by means of the dash-pot connected with the beam of the scale and which may be termed an air brake whereby the tendency of the scale to oscillate is reduced to a minimum.

The scale is capable of being minutely adjusted with a minimum of effort and is therefore easily maintained in a reliable condition and furthermore is readily adjusted to increase its range of operation. By constructing the weight 45 in the form of a sphere and the holder 44 in the form of a ring, the weight is firmly held against independent movement and at the same time its centre is always automatically positioned in the proper location so that no special care need be exercised in placing said weight in its supporting ring.

Various changes in the specific form shown and described may be made within the scope of the claims without departing from the spirit of my invention.

I claim:

1. A scale comprising a support, a main lever pivoted thereon, a platform oscillatingly supported on one end of said main lever, a combination pointer and counterbalance projecting from the other end of said main lever, a supporting member extending in a radial direction from the pivot of said main lever, and a main weight mounted upon said member and axially applied thereby to said main lever.

2. A scale comprising a support, a main lever pivoted thereon, a platform oscillatingly supported on one end of said main lever, a pointer projecting from the other end of said main lever, a counterbalance adjustably mounted on said pointer and a main weight axially applied to said main lever.

3. A scale comprising a support, a main lever pivoted thereon, a platform oscillatingly supported on one end of said main lever, a pointer projecting from the other end of said main lever, a counterbalance adjustably mounted on said pointer, an auxiliary counterbalance connected with said platform and a main weight axially applied to said main lever.

4. A scale comprising a support, a main lever pivoted thereon, a platform oscillatingly supported on one end of said main lever, a combination pointer and counterbalance projecting from and rigidly connected with the other end of said main lever, a main weight axially applied to said main lever and a dash-pot connected with said main lever whereby the tendency of the pointer to vibrate to a position of rest is neutralized.

5. A scale comprising a support, a main lever pivoted thereon, a platform oscillatingly supported on one end of said main lever, a combination pointer and counterbalance projecting from the other end of said main lever, a main weight axially applied to said main lever, a stem depending from said platform, an air brake connected with said stem whereby the tendency of said pointer to vibrate to a position of rest is neutralized and a connection between said air brake and said support whereby the parts are maintained in proper operative relation throughout a given operation of the scale regardless of the position of the article being weighed upon said platform.

6. A scale comprising a support, a main lever pivoted thereon, a platform oscillatingly supported on one end of said main lever, a combination pointer and counterbalance projecting from the other end of said main lever, a main weight axially applied to said main lever and means for interchangeably receiving different weights whereby the initial operative range of the scale is varied, said means being itself adjustable to vary the effect exerted by the weight carried thereby.

7. A scale comprising a support, a main lever pivoted thereon, a platform oscillatingly supported on one end of said main lever, a combination pointer and counterbalance projecting from the other end of said main lever, a main weight axially applied to said main lever, an arm connected with said main lever and provided with means for supporting and interchangeably receiving different weights whereby the initial operative range of said scale is increased.

8. A scale comprising a support, a main lever pivoted thereon, a platform oscillatingly supported on one end of said main lever, a combination pointer and counterbalance projecting from the other end of said main lever, a main weight axially applied to said main lever, an arm adjustably connected with said main lever, a ring at the free end of said arm and a spherical weight adapted to be seated in said ring whereby the initial operative range of the scale is increased.

9. A scale comprising a base, a scale plate projecting upwardly therefrom, uprights extending upwardly from said base and provided with angular recesses, pivotal knife edges setting in the angles of said recesses, a main lever carried by said knife edges and pivotally mounted thereby upon said uprights, knife edges located in proximity to one end of said main lever, a yoke oscillatingly mounted upon said last named knife edges, a platform carried by said yoke, a rod projecting from the other end of said main lever, a pointer at the free end of said rod co-operating with said scale plate, a counterbalance adjustably mounted on said rod to adjust the position of said pointer relatively to said scale plate, an auxiliary counterbalance fixed upon said yoke, a main weight axially applied to said main lever whereby said scale is maintained in balance, a rod depending from said yoke, a dash-pot connected with said rod whereby the tendency of the pointer to vibrate to a position of rest is neutralized and a connection from said rod to said uprights for maintaining the platform and its connected elements in proper operative relation regardless of the position of the article being weighed upon said platform.

10. A scale comprising a base, weighing mechanism mounted on said base and including a pointer having operative movements in a vertical arc and a scale plate curved in a vertical direction about the axis of said pointer and projecting upwardly from said base, said scale plate having its one end secured directly upon said base and its other end free and disconnected.

In testimony whereof I have hereunto set my hand.

CHARLES SIRCH.